(12) United States Patent
Lopez et al.

(10) Patent No.: US 10,544,665 B2
(45) Date of Patent: Jan. 28, 2020

(54) METHOD FOR CALCULATING OPTIMUM GEL CONCENTRATION AND DILUTION RATIO FOR FRACTURING APPLICATIONS

(71) Applicant: SCHLUMBERGER TECHNOLOGY CORPORATION, Sugar Land, TX (US)

(72) Inventors: Miguel Angel Lopez, Sugar Land, TX (US); Rajesh Luharuka, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 597 days.

(21) Appl. No.: 14/817,991

(22) Filed: Aug. 4, 2015

(65) Prior Publication Data
US 2017/0037696 A1     Feb. 9, 2017

(51) Int. Cl.
*E21B 43/26*   (2006.01)
*C09K 8/68*    (2006.01)

(52) U.S. Cl.
CPC .............. *E21B 43/26* (2013.01); *C09K 8/68* (2013.01)

(58) Field of Classification Search
CPC ........ E21B 43/26; E21B 21/06; E21B 21/062; C09K 8/68
See application file for complete search history.

(56) References Cited

U.S. PATENT DOCUMENTS

| | | | | |
|---|---|---|---|---|
| 4,671,665 A * | 6/1987 | McIntire | ............... | B01F 7/1625 366/164.6 |
| 5,382,411 A * | 1/1995 | Allen | .................... | B01F 3/1271 366/153.1 |
| 2001/0000996 A1 * | 5/2001 | Grimland | .............. | B01F 3/1221 366/2 |
| 2003/0196809 A1 * | 10/2003 | Willberg | ................ | C09K 8/685 166/300 |
| 2004/0008571 A1 * | 1/2004 | Coody | .................. | B01F 3/1221 366/154.1 |
| 2006/0107998 A1 * | 5/2006 | Kholy | ................... | B01F 3/1271 137/3 |
| 2010/0254214 A1 | 10/2010 | Fisher et al. | | |

(Continued)

FOREIGN PATENT DOCUMENTS

| | | |
|---|---|---|
| WO | 2009010923 A1 | 1/2009 |
| WO | 2015076784 A1 | 5/2015 |
| WO | WO-2015076784 A1 * | 5/2015 ........... E21B 21/062 |

OTHER PUBLICATIONS

International Search Report and Written Opinion issued in International Patent Appl. No. PCT/US2016/043443 dated Nov. 3, 2016; 17 pages.

*Primary Examiner* — Zakiya W Bates
*Assistant Examiner* — Crystal J Miller

(57) ABSTRACT

A method of preparing a fracturing slurry comprising a concentrated gel and water, the method comprising preparing a concentrated gel from a polymer and water, diluting the concentrated gel with additional water to form a fracturing carrier fluid at a predefined downhole concentration, preparing a fracturing slurry comprising the fracturing carrier fluid, and pumping the fracturing slurry downhole at or below a predefined maximum slurry rate. The fracturing carrier fluid is formed upon allowing the concentrated gel sufficient residence time to at least partially hydrate.

23 Claims, 13 Drawing Sheets

(56) References Cited

U.S. PATENT DOCUMENTS

| | | | |
|---|---|---|---|
| 2012/0273206 A1* | 11/2012 | Zamora | C09K 8/68 166/308.1 |
| 2013/0150268 A1 | 6/2013 | Oldham | |
| 2015/0204165 A1* | 7/2015 | Yeung | E21B 21/062 166/244.1 |
| 2015/0240148 A1* | 8/2015 | Luharuka | E21B 43/26 366/76.1 |

* cited by examiner

METHOD FOR CALCULATING OPTIMUM GEL CONCENTRATION AND DILUTION RATIO FOR FRACTURING APPLICATIONS

BACKGROUND

Hydrocarbons (oil, natural gas, etc.) are obtained from a subterranean geologic formation (i.e., a "reservoir") by drilling a well that penetrates the hydrocarbon-bearing formation. The well provides a partial flowpath for the hydrocarbon to reach the surface. Production of the hydrocarbons (travel of the hydrocarbons from the formation to the wellbore and ultimately to the surface) occurs when a sufficiently unimpeded flowpath from the formation to the wellbore is present.

Hydraulic fracturing, also referred to as fracking, is a primary tool for improving well productivity by creating or extending fractures or channels from the wellbore to the reservoir. Pumping of propping granules, or proppants, during the hydraulic fracturing of oil and gas containing earth formations may enhance the hydrocarbon production capabilities of the earth formation. Hydraulic fracturing injects a viscous fluid into an oil and gas bearing earth formation under high pressure, which results in the creation or growth of fractures within the earth formation. These fractures serve as conduits for the flow of hydrocarbons trapped within the formation to the wellbore. To keep the fractures open and capable of supporting the flow of hydrocarbons to the wellbore, proppants are delivered to the fractures within the formation by a carrier fluid and fill the fracture with a proppant pack that is strong enough to resist closure of the fracture due to formation pressure and is also permeable for the flow of the fluids within the formation.

Most fracturing fluids contain a hydrophilic polymer dissolved in a solvent, such as water. The water-soluble polymers most often used are polysaccharides, guar and guar derivatives. A high level of viscosity of a hydrophilic polymer is reached when the polymer is properly hydrated.

In general, the hydration of a polymer is performed in hydration tanks with large volumes that accept a polymer phase gel and water mixture so as to produce a hydrated fluid as part of a continuous preparation of fracturing fluids. Such hydration tanks have focused primarily on mechanical mechanism movement or paddle based mixing processes which involve moving parts, as well as horse power to produce shear forces that increase the hydration rate of the hydratable polymer and establish the desired hydrated fluid viscosity at the hydration tank output. Various methods have been proposed to reduce the size of the hydration tank to increase the hydration rate of a gel during its residence time within the hydration tank.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of preparing a fracturing slurry comprising a concentrated gel and water, the method including preparing a concentrated gel from a polymer and water, diluting the concentrated gel with additional water to form a fracturing carrier fluid at a predefined downhole concentration upon allowing the concentrated gel sufficient residence time to at least partially hydrate, preparing a fracturing slurry that includes the fracturing carrier fluid and pumping the fracturing slurry downhole at or below a predefined maximum slurry rate.

In another aspect, embodiments of the present disclosure relate to a fracturing system used to prepare a fracturing slurry that includes a concentrated gel and water, the system including a water supply line, a polymer supply unit, a mixer that blends the polymer supplied by the polymer supply unit and the water supplied by the water supply line to form a concentrated gel, at least one hydration tank fluidly connected to the mixer to receive the concentrated gel, a control system configured to move the concentrated gel out of the at least one hydration tank and dilute the concentrated gel upon the concentrated gel reaching a predefined hydration level in the at least one hydration tank to form a fracturing carrier fluid, a mixer that blends the fracturing carrier fluid with proppant supplied by a proppant supply tank to form a fracturing slurry and a pump for pumping the fracturing slurry downhole at or less than a maximum slurry rate.

Other aspects and advantages of the claimed subject matter will be apparent from the following description and the appended claims.

BRIEF DESCRIPTION OF DRAWINGS

Embodiments of the present disclosure are described with reference to the following figures. The same numbers are used throughout the figures to reference like features and components.

DETAILED DESCRIPTION

Generally, embodiments disclosed herein relate to methods and fracturing systems used to prepare a fracturing slurry from a fracturing carrier fluid. More specifically, embodiments disclosed herein relate to the preparation of a fracturing carrier fluid from a concentrated gel and water, in which a control system is configured to control the concentration of the concentrated gel based on a predefined downhole (DH) concentration and a predefined maximum slurry rate, as well as the dilution rate of the concentrated gel to a predefined DH concentration. Thus, in one or more embodiments, the control system may control the polymer feeding into the system, its concentrated gel formation and subsequent dilution based on the polymer exiting the system as a fracturing slurry being pumped downhole.

Figure 1:
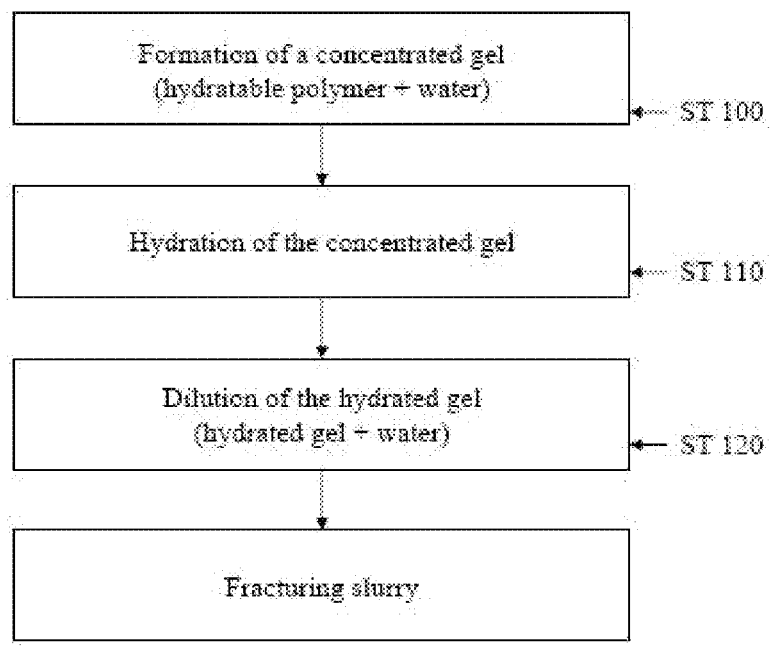
FIG. 1 shows a flowchart for forming fracturing slurries according to embodiments of the present disclosure.

According to embodiments of the present disclosure, the preparation of a fracturing slurry may be performed within few stages. A flowchart in accordance with one or more embodiments is provided as FIG. 1. In FIG. 1, a fracturing carrier fluid concentrate (concentrated gel) is made up at ST 100 of at least two ingredients, namely a hydratable polymer and water as a base fluid. The concentrated gel has the basic attributes of being hydratable and stable. Next, at ST 110, while residing in a hydration tank, the concentrated gel forms a hydrated gel. Next, at ST 120, the hydrated gel is diluted with additional water to form a fracturing carrier fluid at a predefined DH concentration which is afterwards mixed with additives such as proppants with the formation of a fracturing slurry that is pumped under pressure downhole.

In one or more embodiments described herein, the amount of the polymer forming the gel, as well as the rate and the concentration of the gel used to prepare the fracturing carrier fluid are regulated by a control system configured to supply a specific amount of polymer forming the gel to the fracturing system, as well as to control the hydration and the dilution of the gel to a predefined DH concentration. The control system functions based on a mathematical algorithm which uses predefined parameters to calculate the concentration and the delivery rate of the gel within different units of the fracturing system. Thus, at a runtime, the concentration and the rate of the gel are automatically adjusted following the proportions calculated based on predefined parameters such as: the downhole concentration and the maximum slurry rate.

Various hydratable polymers used in fracturing slurries may be any polymer or mixture of polymers as generally known in the art which yield viscosity (i.e., produce a viscosity rise) upon hydration. Thus, the polymers used in the present embodiments include, by way of example but are not limited to, any natural or synthetic polymers including polysaccharides and related polymeric materials such as guar, hydroxypropyl guar (HPG), carboxymethyl hydroxypropyl guar (CMHPG), carboxymethyl hydroxyethyl cellulose, other cellulosics and cellulosic derivatives, polyacrylamides, and similar biopolymers and mixtures thereof. Such polymers hydrate well in the presence of alkali or alkaline-earth salts. Modified guar develops viscosity in electrolyte or salt bearing systems which contain salts such as KCl, NaCl, and $CaCl_2$ concentrations. Guar gum hydrates and develops viscosity very efficiently in a pH range of 7-8 yielding viscosities of 32 to 36 cps in 2% solution of KCl. In addition, hydroxypropyl guar (HPG) hydrates well in many salt systems at 80° F. and also develops excellent viscosity at temperatures around 40° F. Carboxymethyl hydroxypropyl guar (CMHPG) hydrates in most electrolyte make-up solutions, however, it is more sensitive to such salted electrolyte solutions than unmodified guar and HPG. In addition, CMHPG hydrates well in both cold and warm water. Thus, it is intended that references to water within the fracturing system may include fresh water, as well as water containing various salts such as alkali or alkaline earth salts. In contrast to the above natural polymers, synthetic polymers may also be dispersed and hydrated, however they may not be as sensitive to pH effects. Consequently, hydration and dispersion of such synthetic polymers will mainly rely on the mixing shear applied to the aqueous medium in a hydration tank.

Figure 2:
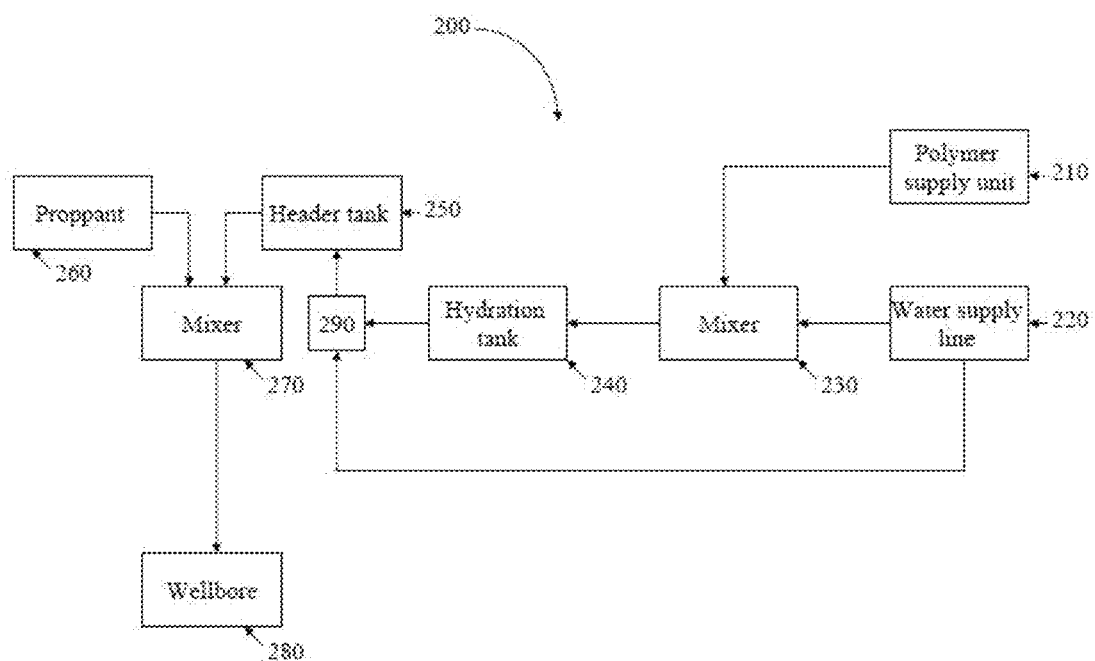
FIG. 2 is a schematic representation of a fracturing system according to embodiments of the present disclosure.

Referring now to FIG. 2, a simplified fracturing system 200 used to prepare a fracturing slurry from a polymer and water is depicted. As shown in FIG. 2, polymer provided from a polymer supply unit 210 is mixed in a mixer 230 with water supplied by a water supply line 220, to form a concentrated gel. In various embodiments, the maximum concentration of the concentrated gel may be 120 lbs/kgal. The concentrated gel is afterwards pumped into a hydration tank 240 which is fluidly connected to the mixer 230 to receive the concentrated gel. The concentrated gel travels within the hydration tank 240 for a residence of time to reach a predefined level of hydration. As defined herein, the residence time is the time spent by the concentrated gel within the hydration tank unit 240 and is dependent on the concentration of the concentrated gel and the maximum rate of the concentrated gel delivered into the hydration tank 240. In addition, the residence time is also dictated by the ability of the gel to absorb water. In various embodiments, the concentrated gel may be at least partially hydrated during a minimum safe residence time. As such, the minimum safe residence time is defined as the minimum time spent by the concentrated gel within the hydration tank sufficient to hydrate the gel at least 85%. In other embodiments, the concentrated gel may be fully hydrated.

In one or more embodiments, the maximum flow rate within the hydration tank 240 may be faster or slower depending on the concentration of the gel entering the hydration tank 240. However, in continuous mix or hydration tank applications wherein the hydration and associated viscosity rise take place over a relatively short time span that corresponds to a minimum residence time of the fluids within a hydration tank during the continuous mix procedure, the rate at which the polymer is hydrated with the formation of the gel may also be considered. There are also other factors that determine how readily a polymer will hydrate or develop viscosity. Such factors may include the pH of the system, the amount of mechanical shear applied in the initial mixing phase, the concentration of salts and the concentration of the polymer. Other factors such as the overall hydration tank volume may also determine the flow rate of the gel through the hydration tank.

According to the present embodiments, the hydration tank 240 is an enclosed tank (such as a pressure vessel) where the fluid motive force (pressure) is used to push the concentrated gel instead of the traditional gravity flow. In addition, the hydration tank has a tortuous spiral path which enhances the fluid shear action and in essence makes the flow process first-in first-out (FIFO).

In various embodiments, the hydrated gel formed in the hydration tank 240 is delivered to a mixing tee junction 290 which is fluidly connected to the hydration tank 240, as well as the water supply line 220. The dilution of the concentrated gel with the formation of the fracturing carrier fluid at a predefined downhole concentration, takes place across the tee junction 290 in a section of the pipe immediately upstream of the header tank inlet, by the shear mixing energy of fluid turbulence. Afterwards, the fluid enters the header tank 250 which is fluidly connected to the tee junction 290.

Figure 3:
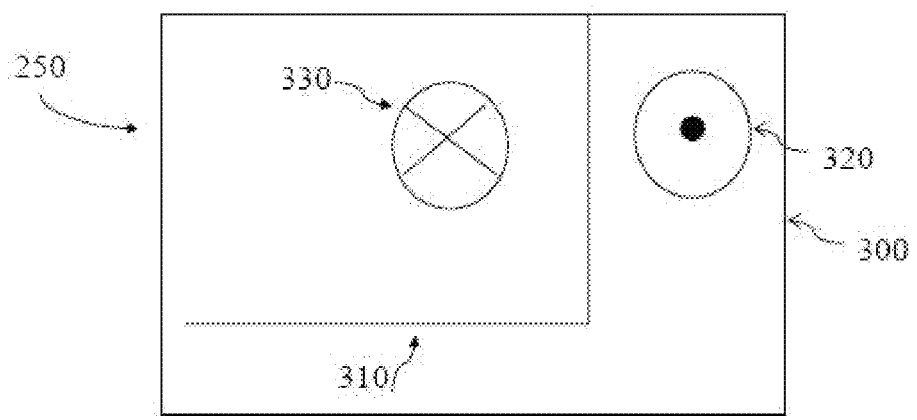
FIGS. 3 and 4 show a header tank according to embodiments of the present disclosure.
Figure 4:
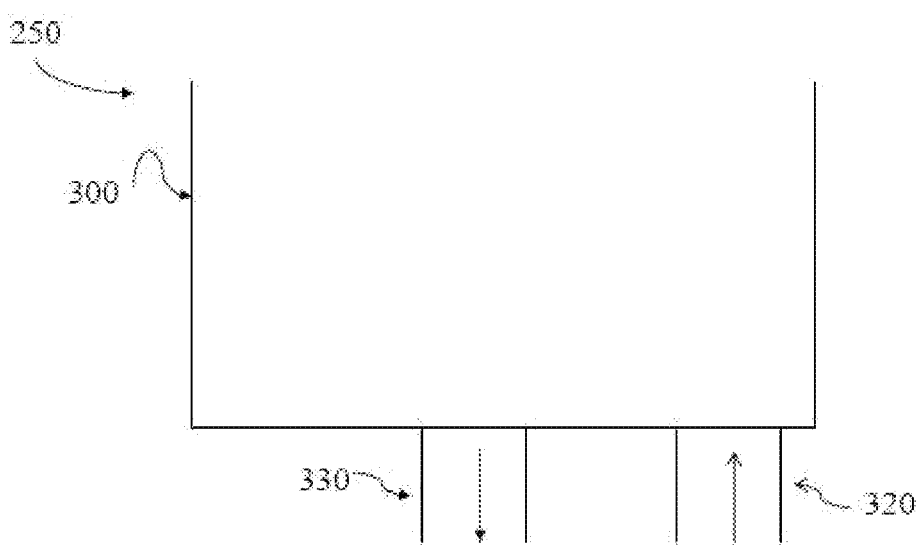
Figure 5:
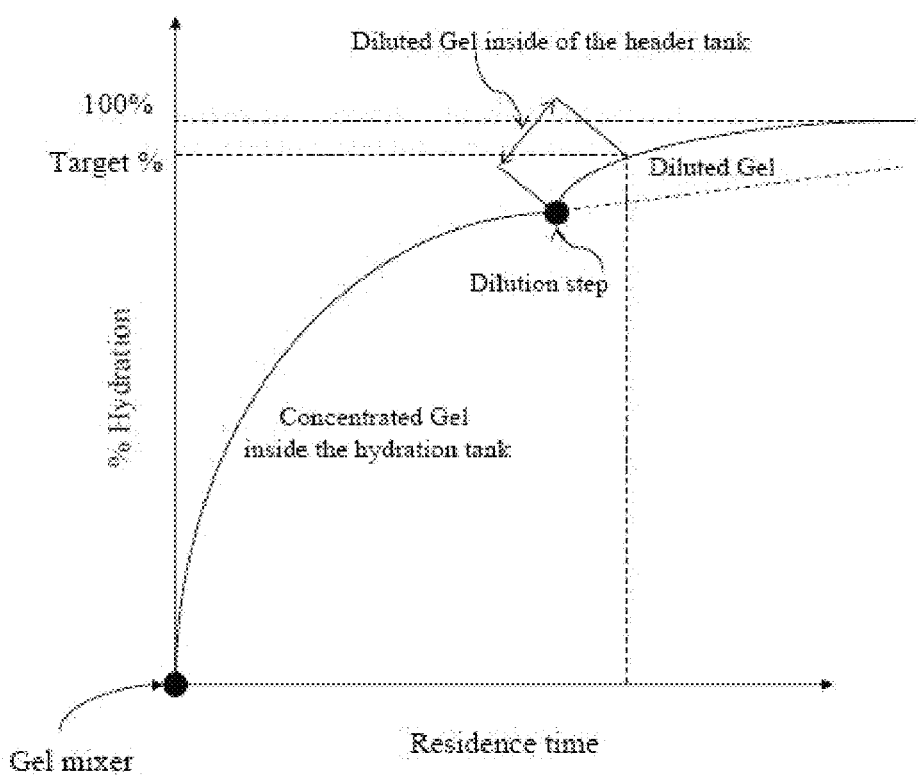
FIG. 5 shows the % hydration versus the residence time according to embodiments of the present disclosure.

According to various embodiments, the header tank 250 is an optional buffer tank that isolates the process fluctuations downstream of the processing unit (frac pumps) from propagating into the gel mixing and hydrating system which is a closed volume system. Referring now to FIGS. 3 and 4, FIGS. 3 and 4 show a top view and a side view, respectively, of a header tank with a FIFO like tank design. As seen in FIGS. 3 and 4, the header tank has a tank wall 300, a baffle 310, an inlet 320 and an outlet 330. In various embodiments, the header tank 250 may be configured with a first-in first-out flow configuration to add additional residence time to the diluted gel before feeding the gel to the mixer 270 (as shown in FIG. 2) (such as a POD mixer) for proppant blending. Referring now to FIG. 5, FIG. 5 shows that quenching of the concentrated gel with excess water during the dilution stage rapidly accelerates the hydration rate. It is also envisioned that in embodiments that use a step change in the gel concentration, similar to pulse fracturing, which will be discussed later, the header tank 250 may be eliminated or minimized.

As used herein, the DH concentration refers to the downhole concentration of the polymer within the fracturing slurry. According to embodiments of the present disclosure, the DH concentration may range from 5 lbs/kgal to 40 lbs/kgal, where the lower limit can be any of 7 lbs/kgal, 10 lbs/kgal or 15 lbs/kgal, and the upper limit can be any of 25 lbs/kgal, 30 lbs/kgal, or 35 lbs/kgal, where any lower limit can be used with any upper limit. In order to avoid transient control issues due to the time delay encountered by the hydration tank 240 before the hydrated gel reaches the header tank 250, a steady concentration at the polymer supply unit 210 may be supplied. In addition, in order to properly maintain a fluid level within the header tank 250, the rate of the concentrated gel and the dilution water may increase and decrease together to maintain the desired ratio to achieve the predefined DH concentration. This may be achieved by controlling a lobe pump (not shown) and a proportional valve in the water supply line. Thus, the rates are indirectly driven by the downhole rate of the high pressure pumps (not shown). The clean fluid rate is measured by a flowmeter (not shown) downstream of the header tank 250. This rate serves as the primary driver to determine the lobe pump (not shown) and the dilution rates. In various embodiments, the rate of the diluted gel exiting the header tank 250 as the fracturing carrier fluid may equal the rate of the hydrated gel and water entering the header tank 250 to maintain a steady fluid level. However, to account for transients in rates and potential response delays, the level of the fluid in the header tank may have an impact on the desired rate. If the level of the fluid in the header tank 250 is low, the rate of the hydrated gel and water entering the header tank 250 may be greater than the rate of the diluted gel exiting the header tank 250. In addition, if the level of the fluid in the header tank 250 is too high, the rate of the hydrated gel and water entering the header tank 250 may be less than the rate of the diluted gel exiting the header tank 250. In various embodiments, a proportional multiplier may be applied to the rates in order to maintain a desired level in the header tank 250. In yet other embodiments two cascaded control loops for fluid level may be used. One of the control loops used for maintaining a desired level of the fluid level uses fluid level sensors as feedback to create a control variable which is a rate setpoint. The rate setpoint feeds two rate control loops which determine the gel % or the water %, respectively, based on the rate setpoint.

In one or more embodiments, the diluted gel extracted from the header tank 250 as the fracturing carrier fluid may be directed to a mixer 270 and may be optionally mixed with a proppant, or a mixture of proppants, supplied by the proppant supply tank 260, with the formation of a fracturing slurry with a desired concentration for use in hydraulic fracturing, as shown in FIG. 2. In one or more embodiments, the fracturing slurry may be pumped downhole with continuous or periodic addition of proppant thereto. Other additives such as suspension agents and surfactants, or other optional additives commonly employed in well treatment applications may be used. According to the present embodiments, the proppant density added to the slurry measured in pounds proppant added (PPA) (per gallon) may range from 0.2 PPA to 22 PPA, with a maximum proppant rate of 24,000 lbs/min (12,000 lbs/min on each side). The proppant transport ability of a base fluid depends on the type of viscosifying additives added to the water base. The fracturing slurry is pumped into a fracture of a wellbore 280 (as shown in FIG. 2) to prevent it from closing when the pumping pressure is released. According to various embodiments, the fracturing slurry may be pumped downhole at or below a predefined maximum slurry rate. For example, the fracturing slurry may be pumped downhole at a rate that ranges from 10 bpm to 120 bpm, where the lower limit can be any of 15 bpm or 20 bpm, and the upper limit can be any of 90 bpm, 110 bpm or 115 bpm, where any lower limit can be used with any upper limit. In one or more embodiments, the fracturing system contains a plurality of pumps, valves and flowmeters (not shown in FIG. 2).

In various embodiments, a control system (not shown) that has the ability to control the concentration of the concentrated gel to an optimum value based on the desired job specifics (downhole slurry rate and concentration) is used. Specifically, the control system is configured to supply a certain amount of polymer into the fracturing system with the formation of a concentrated gel, and to move the concentrated gel through different units of the fracturing system for hydration and dilution to a predefined DH concentration. In one or more embodiments, the control system is configured to move the concentrated gel into the tee junction 290 (as shown in FIG. 2) and to dilute the concentrated gel upon the concentrated gel reaching a predefined hydration level in the hydration tank 240. Various elements throughout the process such as the amount of the polymer added to produce the concentrated gel, the gel residence time in the hydration tank 240, and the dilution process in the header tank 250 may affect the final DH concentration. Therefore, these elements may be carefully controlled to specific optimum values. One of the parameters that may affect these optimum values is the slurry rate. The maximum slurry rate is given in each job design and may be used in the calculation of the optimum concentration of the concentrated gel setpoint and the maximum dilution ratio.

Figure 6:
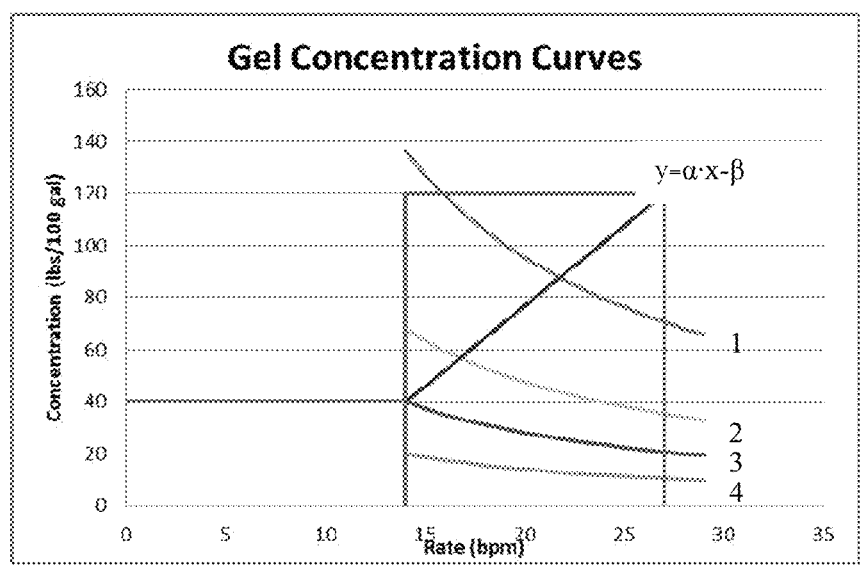
FIG. 6 shows gel concentration curves according to embodiments of the present disclosure.

According to various embodiments, the control system (not shown) is based on a mathematical algorithm that uses predefined parameters such as the downhole concentration and the maximum slurry rate (defined as the maximum pumping rate of the slurry) to generate a series of performance curves (or gel concentration curves), as shown in FIG. 6. The actual slurry rate is live as it changes throughout the job, and therefore it cannot be controlled. According to various embodiments, the control system may adapt to the real slurry rate by following a concentration setpoint design.

As described in detail below, parameters such as a) the concentration of the concentrated gel (defined as the maximum concentration of the concentrated gel prior entering the hydration tank 240); b) the maximum gel rate (defined as the maximum possible rate of the concentrated gel exiting the hydration tank 240); c) the polymer rate which is a function of the rate of the concentrated gel and the concentration of the concentrated gel; and d) the maximum polymer rate (defined as the maximum rate of polymer being pumped downhole), may be calculated and further used to adjust various parameters to arrive at the predefined DH concentration. Specifically, the control system controls the concentration of the concentrated gel used to prepare the fracturing carrier fluid based on a predefined DH concentration and on a predefined maximum slurry rate. In various embodiments, the control system controls a maximum gel rate (of the concentrated gel as it enters the header tank for dilution) and a maximum dilution rate of the concentrated gel for the dilution to a predefined DH concentration. Due to the fact that there are rate limitations of the gel delivery system and minimum residence time for a full hydration of the gel, determining these parameters is not straightforward.

In one or more embodiments, the proposed method may determine an optimum concentration and rate for the concentrated gel based on the desired final DH concentration and the maximum slurry pumping rate expected for the job, giving the concentrated gel sufficient residence time for hydration. Once the job starts, the system may run a fixed gel concentration based on this calculation and may adjust the setpoint or delivery rate of the polymer and the concentrated gel, as well as the dilution ratio following the proportions determined previously, avoiding transient timing issues and ensuring full hydration by guaranteeing the desired residence time for the concentrated gel, particularly based on changes in the actual slurry rate, as compared to the maximum slurry rate. However, the present disclosure is not limited and in one or more embodiments, the concentration of the concentrated gel may be varied during the course of the job, as may the concentration of the polymer in the final slurry.

According to the present disclosure, the system may pump a fixed gel concentration continuously, as well as sequentially, similar to the "pulse fracturing". For example, the control system may pulse gel between a high and a low limit of concentration at every few seconds (typical 10 seconds) to several minutes pulses. It is also envisioned that a uniform ramp or a step increase of the gel concentration that corresponds with the proppant concentration may be used. In such an embodiment, the gel aids in carrying the proppant into the formation. The inventors of the present disclosure have found that it takes a short period of time (few seconds) to reach an actual ramp or a step change in the concentration of the gel compared to a lag of 3-15 minutes as in conventional systems.

Figure 7:
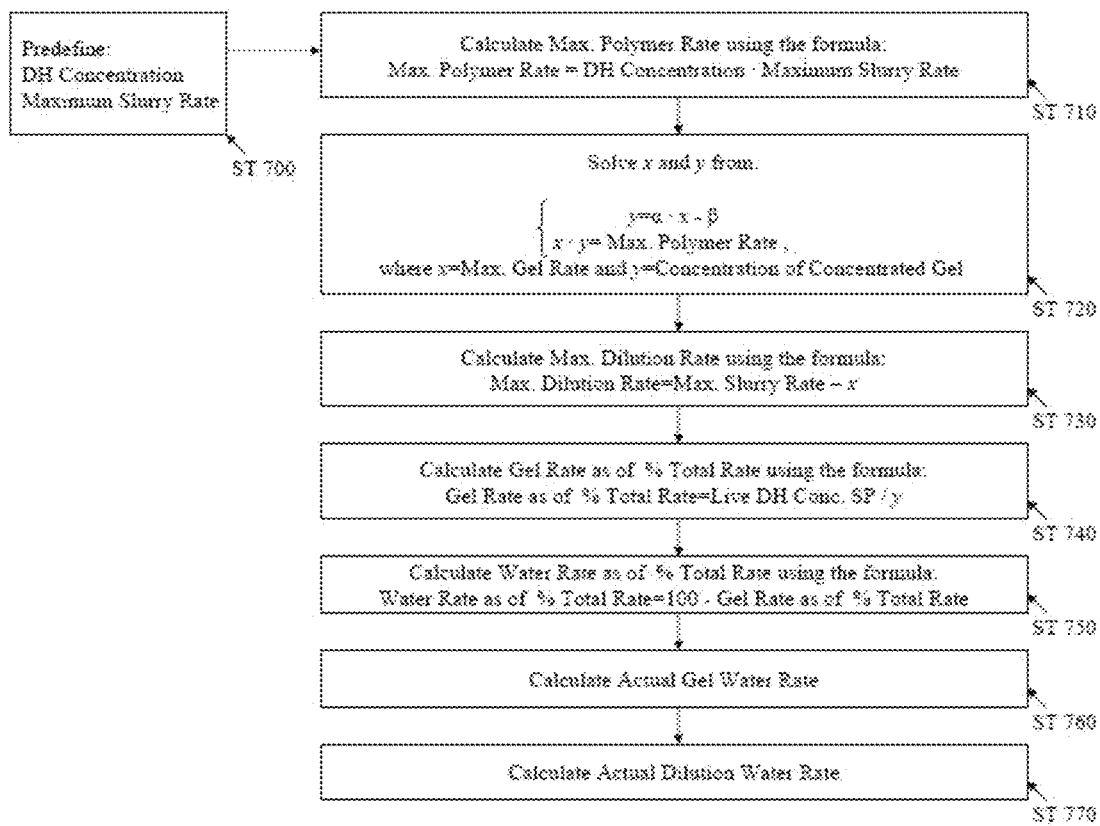
FIG. 7 shows a flowchart for calculating various parameters according to embodiments of the present disclosure

Referring now to FIG. 7, a flowchart summarizing a mathematical algorithm used by the control system in accordance with one or more embodiments is provided. As seen in FIG. 7, the DH concentration and the maximum slurry rate are predefined values in ST 700. As seen in ST 710 of FIG. 7, the relationship between the DH concentration (in $kg/m^3$) and the maximum slurry rate (in $m^3/s$) yields the maximum amount of polymer desired per second to maintain the predefined DH concentration for a job running at this rate. Such a relationship is defined by the following equation:

$$\text{Max. Slurry Rate } [m^3/s] \cdot \text{DH Concentration } [kg/m^3] = \text{Max. Polymer Rate } [kg/s] \quad (1)$$

Similarly, the polymer rate may be calculated using the following equation:

$$\text{Fracturing Carrier Fluid Rate } [m^3/s] \cdot \text{DH Concentration } [kg/m^3] = \text{Polymer Rate } [kg/s] \quad (2)$$

The polymer rate, as well as the carrier fluid rate, determine the concentration of the gel. In the case of the concentrated gel, the fluid carrier rate refers to the rate of the fluid going through the gel line. In the case of the downhole gel, the fluid rate also includes the dilution water rate and hence the concentration is reduced. In various embodiments, the maximum polymer rate may also hold for the relationship between the concentration of the concentrated gel (in $kg/m^3$) prior to entering the hydration tank 240 and the maximum gel rate (in $m^3/s$) exiting the hydration tank 240, as defined by equation 3:

$$\text{Max. Gel Rate } [m^3/s] \cdot \text{Concentration of Concentrated Gel } [kg/m^3] = \text{Max. Polymer Rate } [kg/s] \quad (3)$$

As previously discussed, the DH concentration and the maximum slurry rate are predefined values. Thus, based on equation 1, the maximum polymer rate is a known value that may be calculated for each job design. However, at ST 710, the appropriate combination of concentrated gel rate and the concentration of the concentrated gel that may yield a particular polymer rate are yet to be determined based on the gel hydration concept using the flowchart provided in FIG. 7.

As noted above, the residence time varies depending on the gel concentration. Specifically, at a lower concentration, the gel takes longer time to hydrate. For example, in various embodiments, a gel with a concentration of less than 40 lb/kgal has a residence time of approximately 220 seconds in the hydration tank 240. However, according to various embodiments, the residence time may have a different value, as it is dictated by the temperature, shear energy and pH. If these factors are fixed, a higher concentration may result in a shorter residence time, as discussed in more detail later. This difference in residence time impacts the concentrated gel rate (rate at which the concentrated gel is pumped out of the hydration tank and into the header tank). According to various embodiments, the maximum concentrated gel rate may range from 0 bpm to 27 bpm, where the lower limit can be any of 3 bpm or 5 bpm, and the upper limit can be any of 15 bpm, 20 bpm or 25 bpm, where any lower limit can be used with any upper limit. In various embodiments, the maximum concentrated gel rate may be higher than 27 bpm, depending on the truck design. At a slower gel rate, the gel has sufficient time to hydrate before being pumped downhole. However, the residence time is shorter at a higher rate, and therefore, the concentration of the concentrated gel may be higher than the actual downhole concentration to meet the residence time condition. In various embodiments, when the concentration of the concentrated gel is high, the rate of the gel may be reduced by diluting the gel. As a result, the residence time in the hydration tank may increase. According to experimental findings of the present inventors, the relationship between the gel rate (of the concentrated (and hydrated) gel entering a header tank for dilution) and the concentration of the concentrated gel that allows to achieve the proper hydration residence time may be used to define an "ideal hydration line", a linear estimation of which is presented in equation 4:

$$\text{Concentration of Concentrated Gel} = \alpha \cdot \text{Max. Gel Rate} - \beta \quad (4)$$

As described herein, $\alpha$ and $\beta$ are coefficients that depend on the experimental factors, such as, for example, the type of polymer used to prepare the gel.

For simplification purposes, it is considered that x=Max. Gel Rate as described in equation 2, and y=Concentration of Concentrated Gel, as defined in equations 3 and 4. As a result, equation 4 may be rewritten as:

$$y = \alpha \cdot x - \beta \quad (5),$$

Similarly, equation 1 may be rewritten as:

$$x \cdot y = \text{Max. Polymer Rate} \quad (6)$$

In various embodiments of the present disclosure, (x) (Max. Gel Rate) and (y) (Concentration of Concentrated Gel) may be calculated according to ST 720 of FIG. 7, by combining equations 5 and 6:

$$x=[\beta+\sqrt{(\beta^2+4\cdot\alpha\cdot\text{Max. Polymer Rate})}]/2\cdot\alpha \quad (7)$$

$$y=\{\alpha\cdot[\beta+\sqrt{(\beta^2+4\cdot\alpha\cdot\text{Max. Polymer Rate})}]/2\cdot\alpha\}-\beta \quad (8)$$

In various embodiments, the calculated (x) (Max. Gel Rate) may be used to determine the rate in which the water supply line 220 may supply water to the header tank unit 250 in order to match the predefined DH concentration and to maintain the concentration as computed. As seen in FIG. 6, gel concentration curves may be used to indicate what concentrated gel concentrations and gel rates may be in the optimum operating range (within the area defined by a 14 bpm minimum rate, 120 lbs/kgal maximum gel concentration and the ideal hydration line) for given polymer rates, which gives an indication on the design of the gel. Referring now to ST 730, ST 740 and ST 750 of FIG. 7, the calculated maximum gel rate, (x), may be further used to calculate the maximum dilution rate, the gel rate and the water rate both as of % total rate, as described by the following equations:

$$\text{Max. Dilution Rate}=\text{Max. Slurry Rate}-x \quad (9)$$

$$\text{Gel Rate as of \% Total Rate}=\text{live DH gel concentration } SP/y \quad (10)$$

$$\text{Water Rate as of \% Total Rate}=100-\text{Gel Rate as of \% Total Rate} \quad (11)$$

As described herein, the live DH gel concentration SP represents the live downhole concentration setpoint for a particular fracturing job. This concentration determines the gel and water rate as of % Total Rate based on the concentration of the concentrated gel. In various embodiments, in order to account for real life inaccuracies, based on measured viscosity of samples, the user of the fracturing system may have the ability to tweak the downhole concentration setpoint without having to change the concentration of the heavy gel. For example, the ratio of gel/water may be changed to make the final gel a little heavier or a little lighter. In one or more embodiments, if the live concentration is a little higher than the desired DH concentration, the system will use a higher percentage of gel. Similarly, if the live concentration is a little lower than the desired DH concentration, the system will use a lower percentage of gel. In yet other embodiments, when the live DH concentration is 0, it will cut gel immediately. In various embodiments, if the live DH gel concentration SP matches the desired DH concentration, then there is no change to the algorithm. The use of the live DH concentration has the advantage to allow a human operator to prime up the tanks with gel and go from clean fluid to gel in a very short period of time by changing the live setpoint from 0 to the actual concentration and changing the ratio from 100% water to the desired dilution ratio.

The above values are calculated based on the maximum slurry rate. However, the actual rate of the fracturing slurry that is pumped downhole may be less than the maximum amount, and thus the gel rate and dilution rate should be decreased from the calculated maximum values if the actual slurry rate is less than the maximum slurry rate. Without this corresponding decrease, the volume of diluted gel in the header tank may increase to an unmanageable amount. By calculating both the maximum and actual rates, the control system may operate to draw gel and water into the header tank for dilution to the desired downhole concentration based on the demands of the downhole pumping rate. The actual gel water rate and the actual dilution water rate may be calculated as setpoints for the control system according to ST 760 and 770 of FIG. 7, based on the amount of water used to maintain the desired fluid level in the header tank. It is also envisioned that the actual gel water rate and the actual dilution water rate may be defined by the following equations and calculated as setpoints for the control system as shown in FIG. 7:

$$\text{Actual Gel Water Rate}=\text{Gel Rate as of \% Total Rate}\cdot\text{Actual Slurry Rate} \quad (12)$$

$$\text{Actual Dilution Water Rate}=\text{Water Rate as of \% Total Rate}\cdot\text{Actual Slurry Rate} \quad (13)$$

In one or more embodiments, the time to flush the system is defined by the following equation (not shown in FIG. 7):

$$\text{Time to flush (min.)}=\text{Gel Tank and Piping Volume}/x \quad (14)$$

The concentration of the concentrated gel, if substantially greater than the optimum calculation may result in a lower gel rate and thus greater time to flush the system of the volume of gel contained therein. Thus, the concentration of the concentrated gel may be reduced, for example, if an excessively large time value to flush is calculated.

Thus, as described above, based on the parameters provided by the mathematical algorithm as described in FIG. 7, the control system may adjust the amount of the polymer used to prepare the gel, the delivery rate of the gel into the hydration tank desired to reach a predefined hydration level, as well the dilution rate of the concentrated gel to form the fracturing carrier fluid at the predefined DH concentration.

EXAMPLES

The following examples are provided to further illustrate the application and the use of the methods of the present disclosure. The present examples apply a mathematical algorithm to a predefined set of parameters to assess the rate and the dilution rate of a concentrated gel. The gel is prepared using guar and water.

As seen in Table 1, the predefined parameters are the DH concentration (20 lbs/kgal) and the maximum slurry rate (100 bpm), while the other values may be calculated using the methods described herein. Initially, referring now to the mathematical algorithm shown in FIG. 7, the maximum polymer rate can be calculated as shown in ST 710 using equation 1, based upon the DH concentration and the maximum slurry rate.

TABLE 1

Calculation of various parameters used by the control system.

|  | Optimum | Simple fixed 120 # for all jobs |
|---|---|---|
| Actual slurry rate (bpm) | 80 | 80 |
| DH Concentration (lbs/1000 gal) | 20 | 5 |
| Max. Slurry Rate (bpm) | 100 | 100 |
| Max. Polymer Rate (lbs/min) | 84 | 21 |
| Concentration of the concentrated gel (lbs/1000 gal) | 90 | 120 |
| Gel Rate (bpm) | 22 | 4.17 |
| Max. Dilution Rate (bpm) | 78 | 95.83 |
| Gel Rate as % of Total Rate | 22% | 4% |
| Water Rate as % of Total Rate | 78% | 96% |
| Actual Gel Water Rate (bpm) | 18 | 3.33 |
| Actual Dilution Water Rate (bpm) | 62 | 76.67 |
| Gel Tanks and Piping Volume (B) | 54 | 54 |
| Time to flush (min) | 2.44 | 12.96 |

TABLE 1-continued

Calculation of various parameters used by the control system.

|  | Optimum | Simple fixed 120 # for all jobs |
|---|---|---|

In various embodiments, a minimum safe residence time of the concentrated gel may be estimated for the theoretical implementation of the algorithm by plotting the residence time versus the gel concentration values shown in Table 2. The actual values may vary, depending on the experimental conditions.

TABLE 2

Variation of the residence time with the concentration of the gel.

| Concentration (#/1000 gal.) | Residence Time (s) |
|---|---|
| 120 | 120 |
| 40 | 220 |
| 5 | 220 |

Figure 8:
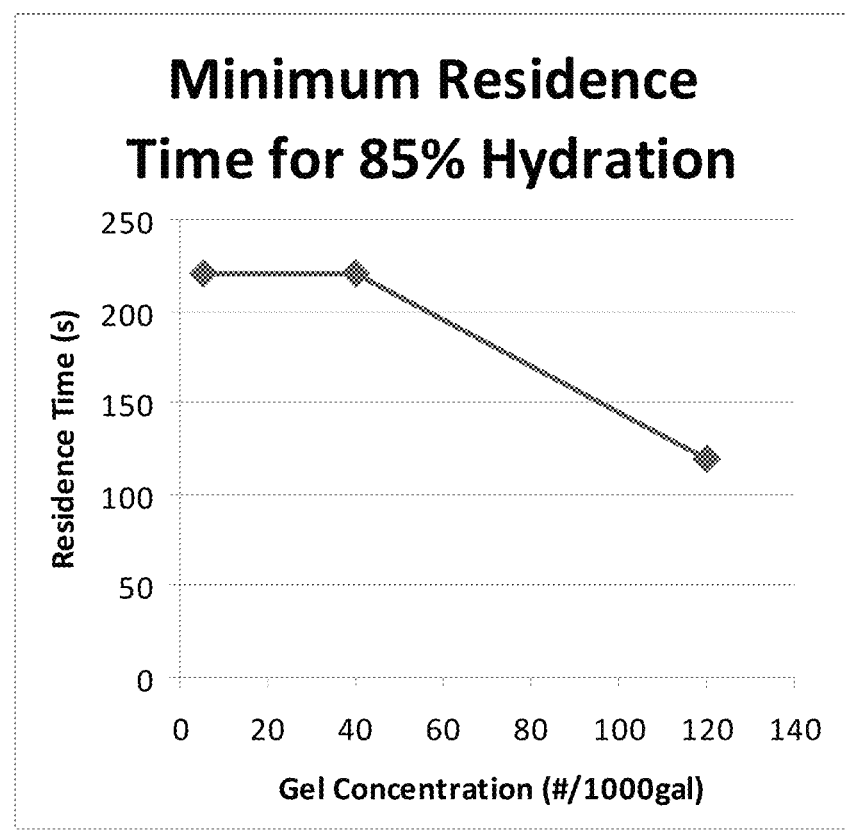
FIG. 8 shows the minimum residence time for 85% hydration according to embodiments of the present disclosure.
Figure 9:
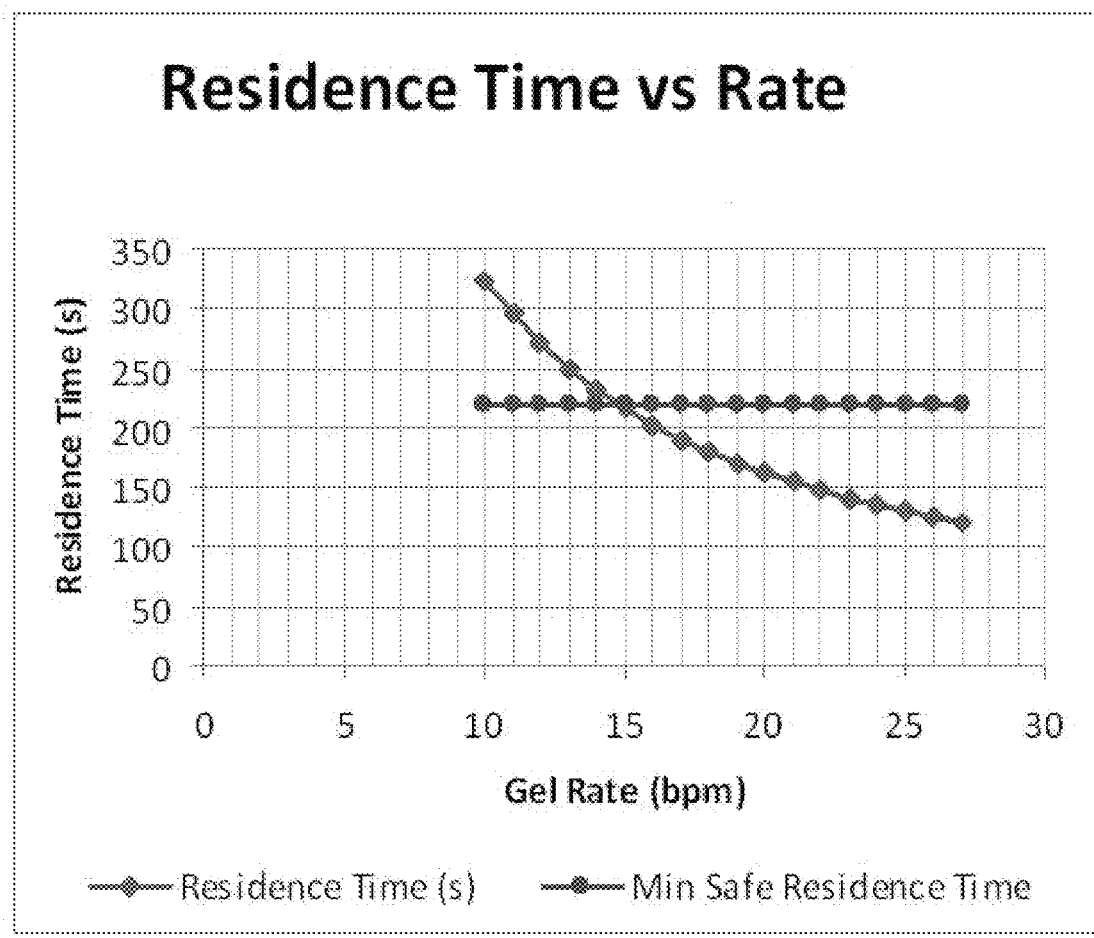
FIG. 9 shows the residence time versus the gel rate according to embodiments of the present disclosure.

As seen in Table 2 and FIG. 8, the amount of time desired to fully hydrate the concentrated gel varies depending on its concentration. At a lower concentration, such as in the range 5-40 lbs/kgal, the gel takes a longer time to hydrate. As such, the residence time in the hydration tank for a gel with a concentration of less than 40 lbs/kgal is 220 seconds. As seen in FIG. 8, the residence time decreases as the gel becomes more concentrated. Specifically, FIG. 8 shows that for a concentration of 120 lbs/kgal of gel, the residence time is 120 seconds. When the gel moves at a slower rate within the hydration tank 240, the gel has sufficient time to hydrate before being pumped downhole. As seen in FIG. 8, the hydration line is defined by a gel concentration ranging from 40 lbs/kgal to 120 lbs/kgal. The linear estimation of the ideal hydration line is used to solve for the equations 7 and 8. However, the representation of the minimum safe residence time as shown in FIG. 9 is theoretical. The actual representation may be determined based on the experimental values represented in Table 3.

TABLE 3

Experimental values indicating the residence and the minimum safe residence time.

| Volume (Barrels) | Gel Rate (BPM) | Residence Time (s) | Min. Safe Residence Time (s) |
|---|---|---|---|
| 54 | 27 | 120 | 220 |
| 54 | 26 | 125 | 220 |
| 54 | 25 | 130 | 220 |
| 54 | 24 | 135 | 220 |
| 54 | 23 | 141 | 220 |
| 54 | 22 | 147 | 220 |
| 54 | 21 | 154 | 220 |
| 54 | 20 | 162 | 220 |
| 54 | 19 | 171 | 220 |
| 54 | 18 | 180 | 220 |
| 54 | 17 | 191 | 220 |
| 54 | 16 | 203 | 220 |
| 54 | 15 | 216 | 220 |
| 54 | 14 | 231 | 220 |
| 54 | 13 | 249 | 220 |
| 54 | 12 | 270 | 220 |
| 54 | 11 | 295 | 220 |

TABLE 3-continued

Experimental values indicating the residence and the minimum safe residence time.

| Volume (Barrels) | Gel Rate (BPM) | Residence Time (s) | Min. Safe Residence Time (s) |
|---|---|---|---|
| 54 | 10 | 324 | 220 |

Referring now to FIG. 9, the representations of an actual residence time and the minimum safe residence time versus rate are depicted. Additionally, the intersection of both the actual curve and the theoretical line as seen in FIG. 9 defines the maximum rate (14 bpm) that may allow a gel with low concentration enough time to hydrate. According to the present embodiments, if the rate is less than 14 bpm, the concentrated gel may have the same concentration as the DH concentration. Otherwise, the concentration of the concentrated gel may compensate for the insufficient residence time.

Referring now to ST 720 of FIG. 7, the maximum gel rate (x), and the concentration of the concentrated gel (y) are calculated by using equations 5 and 6. These values can also be determined graphically as shown in FIG. 10 from the intersection of the hydration line with a performance curve (gel concentration curve) as defined by the parameters shown in Table 1.

Figure 10:
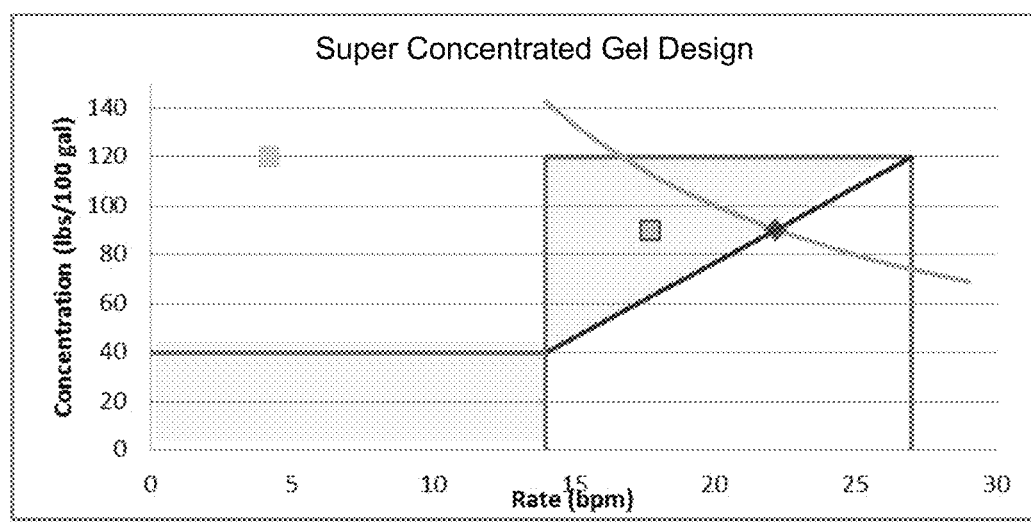
FIG. 10 shows the concentrated gel design according to embodiments of the present disclosure.
Figure 11:
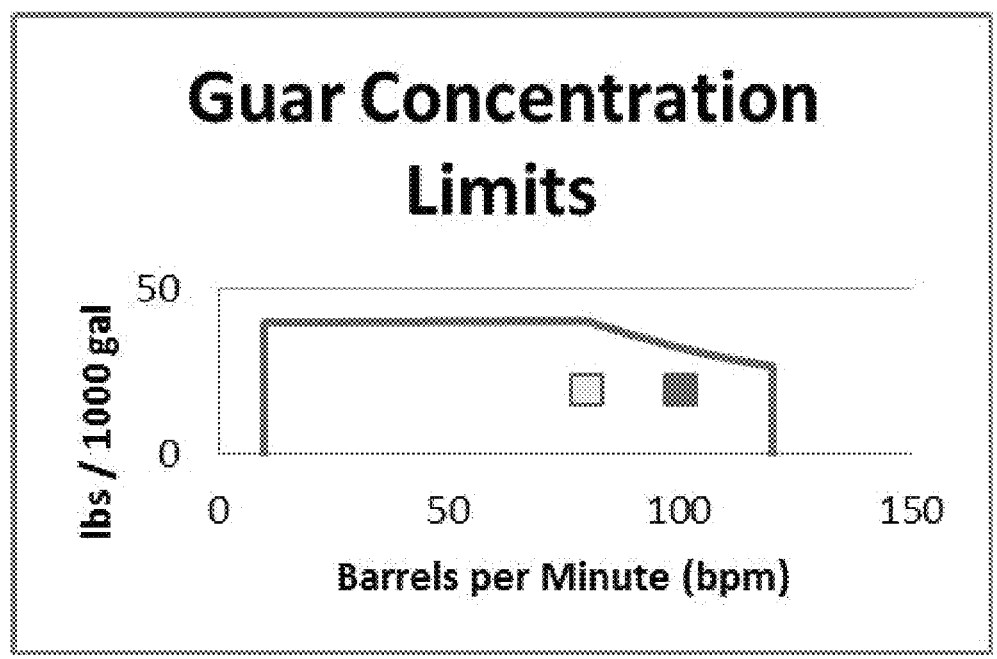
FIGS. 11 and 12 show the guar concentration limits according to embodiments of the present disclosure.
Figure 12:
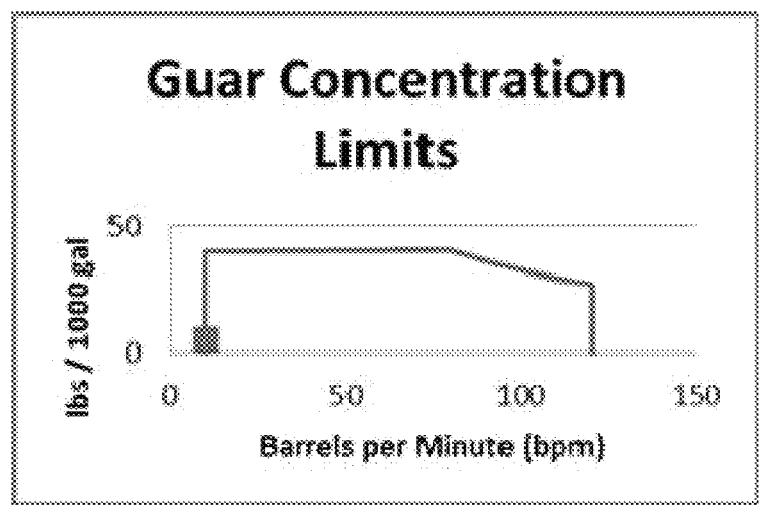
Figure 13:
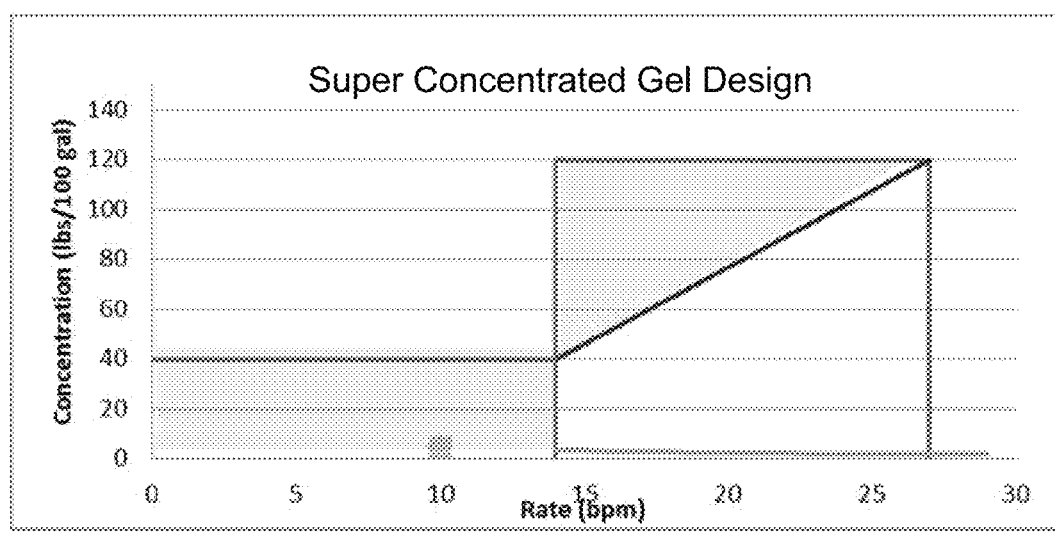
FIGS. 13 and 14 show the concentrated gel design according to embodiments of the present disclosure.
Figure 14:
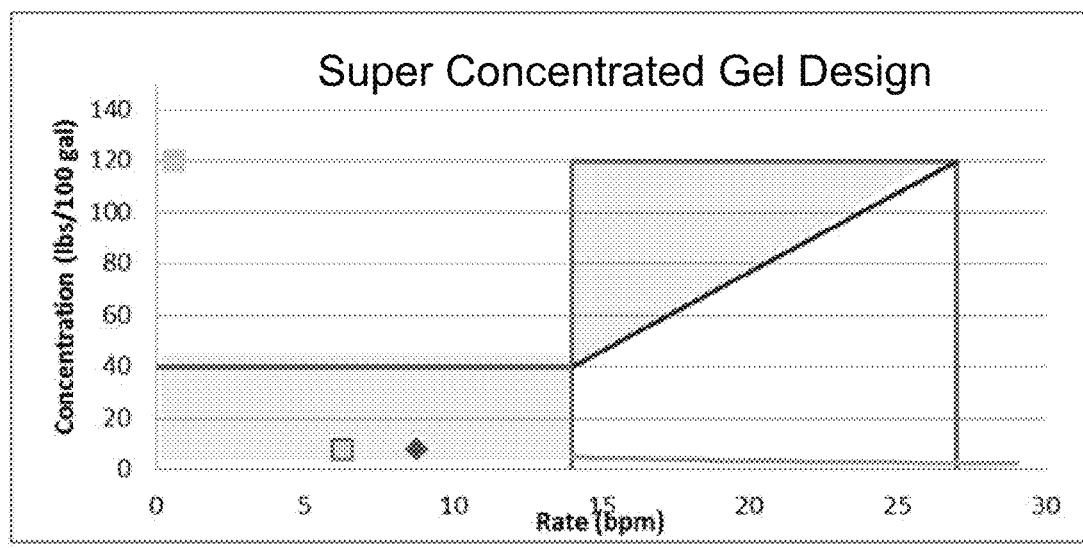

Referring now to FIG. 10, a representation of the concentration of the gel versus the rate of the gel is depicted. As seen in FIG. 10, the two shaded areas, a rectangle and a triangle, are defined by the intersection of the following lines: a) concentration versus rate when the concentration of the gel is 40 lbs/kgal; b) concentration versus rate when the concentration of the gel is 120 lbs/kgal; c) concentration versus rate for a rate of 14 bpm. The hypotenuse of the triangle is defined by the hydration line as described by equation 4. As seen in FIG. 10, the optimum concentration of the concentrated gel (90 lbs/kgal) and the downhole polymer rate (22 bpm) calculated as previously described, represent the intersection of the corresponding hydration line with the performance curve as defined by the parameters shown in Table 1. Once these parameters are determined, the control system adjusts the amount of the guar and the guar rate desired to prepare the fracturing carrier fluid with the predefined DH concentration. The design of the gel is considered optimum as long as the determined values are within the optimum operating range defined by the shaded triangular area. As seen in FIG. 10, the point representing a rate of 5 bpm and a DH concentration of 120 lbs/kgal is located outside of the optimum operating range. In such a case it may be possible that the actual rate is in fact much lower than the maximum rate, so there could be operation below 14 bpm at a concentration higher than 40 lbs/kgal. This case is not optimal, but it may be possible if the rate is expected to increase. In addition, the guar concentration limits may be determined by representing the slurry concentration versus the slurry rate, as shown in FIG. 11. Referring now to Table 4, two sets of experimental data are presented, where the actual slurry rate is 10 bpm and the downhole concentration is 5 lbs/kgal. The guar concentration limits for these sets of data is shown in FIG. 12, while FIGS. 13 and 14 show the gel performance curves and the hydration line as defined by the parameters described in Table 4. As noted above, a performance curve for each set of data identifying the minimum rate and concentration to achieve a hydration rate above 14 ppm is used to intersect the hydration line and to determine the optimum (x) and (y) values.

TABLE 4

Calculation of the parameters used by the control system for two different sets of experimental data.

|  | Set I | | Set II | |
| --- | --- | --- | --- | --- |
|  | Optimum | Simple fixed 120 # for all jobs | Optimum | Simple fixed 120 # for all jobs |
| Actual slurry rate (bpm) | 10 | 10 | 10 | 10 |
| DH Concentration (lbs/1000 gal) | 5 | 5 | 5 | 5 |
| Max. Slurry Rate (bpm) | 10 | 10 | 14.1 | 14.1 |
| Max. Polymer Rate (lbs/min) | 2.1 | 2.1 | 2.961 | 2.961 |
| Concentration of the concentrated gel (lbs/1000 gal) | 5 | 5 | 8 | 120 |
| Polymer Rate (bpm) | 10 | 10 | 9 | 0.59 |
| Max. Dilution Rate (bpm) | 0 | 0 | 5 | 13.51 |
| Gel Rate as % of Total Rate | 100% | 100% | 62% | 4% |
| Water Rate as % of Total Rate | 0% | 0% | 38% | 96% |
| Actual Gel Water Rate (bpm) | 10 | 10 | 6 | 0.42 |
| Actual Dilution Water Rate (bpm) | 0 | 0 | 4 | 9.58 |
| Gel Tanks and Piping Volume (B) | 54 | 54 | 54 | 54 |
| Time to flush (min) | 5.4 | 5.4 | 6.14 | 91.91 |

As seen from Table 4, the time to flush the system is 5.4 min. for a downhole concentration of 5 lbs/kgal, compared to 91.91 min. for a downhole concentration of 120 lbs/kgal. The guar concentration limits and the concentrated gel design curves are shown in FIGS. 12-14.

Advantageously, embodiments of the present disclosure may provide controlled fracturing systems and methods of preparing fracturing fluids from a concentrated gel and water. The use of a control system configured to move the gel through the fracturing system and to regulate the amount and the rate of the concentrated gel used to prepare a fracturing carrier fluid with a predefined concentration, which, upon mixing with various additives, such as proppants, forms a fracturing slurry, advantageously allows for controlling the residence time within the hydration tank to a predefined hydration level and the proportion of flow rates of the gel and the dilution ratio to obtain a predefined concentration. The method also minimizes the foot print of the hydration tank as the volume of the tank is reduced.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of preparing a fracturing slurry comprising a concentrated gel and water, the method comprising:
   preparing a concentrated gel from a polymer and water in a hydration tank;
   allowing the concentrated gel sufficient residence time to at least partially hydrate in the hydration tank;
   delivering the concentrated gel to a mixing tee junction to which a water supply line is connected;
   diluting the concentrated gel with additional water at the mixing tee junction to form a fracturing carrier fluid at a predefined downhole concentration;
   delivering the fracturing carrier fluid to a header tank configured with a first-in-first-out flow configuration;
   preparing a fracturing slurry comprising the fracturing carrier fluid; and
   pumping the fracturing slurry downhole at or below a predefined maximum slurry rate.

2. The method of claim 1, further comprising: controlling a concentration of the concentrated gel based on the predefined downhole concentration and the predefined maximum slurry rate.

3. The method of claim 1, wherein the residence time of the concentrated gel is dependent on a concentration of the concentrated gel and a maximum concentrated gel rate.

4. The method of claim 3, wherein the residence time of the concentrated gel is sufficient to fully hydrate the concentrated gel.

5. The method of claim 3, wherein the residence time of the concentrated gel is sufficient to hydrate the gel at least 85%.

6. The method of claim 3, further comprising: controlling the maximum concentrated gel rate and a maximum dilution rate of the concentrated gel for the diluting.

7. The method of claim 6, further comprising determining, with the control system, a performance curve based on the maximum slurry rate and the downhole concentration and wherein controlling the maximum concentrated gel rate and the maximum dilution rate of the concentrated gel is based on at least on the performance curve.

8. The method of claim 3, wherein the maximum concentrated gel rate ranges from 0 bpm to 27 bpm.

9. The method of claim 1, further comprising: determining, with the control system, a hydration line based on a concentrated gel rate and on the concentration of the concentrated gel.

10. The method of claim 9, wherein an intersection of the hydration line with at least one performance curve defines the optimum concentration of the concentrated gel and the maximum concentrated gel rate.

11. The method of claim 10, further comprising: determining an actual gel rate setpoint based on the maximum concentrated gel rate and an actual slurry rate relative to the predefined maximum slurry rate.

12. The method of claim 10, further comprising: determining an actual dilution water rate setpoint based on a maximum dilution rate and an actual slurry rate relative to the predefined maximum slurry rate.

13. The method of claim 1, wherein a rate of delivering the concentrated gel and a rate of diluting the concentrated gel with water increase and decrease together to maintain a ratio to achieve the predefined downhole concentration in order to maintain a fluid level within the header tank.

14. A fracturing system used to prepare a fracturing slurry comprising a concentrated gel and water, the system comprising:
   a water supply line;
   a polymer supply unit;

a mixer that blends the polymer supplied by the polymer supply unit and the water supplied by the water supply line to form a concentrated gel;

at least one hydration tank fluidly connected to the mixer to receive the concentrated gel;

a header tank that receives the fracturing carrier fluid from a tee junction, the tee junction fluidly connected to the at least one hydration tank and the water supply line, wherein the header tank is configured with a first-in-first-out configuration;

a control system configured, upon the concentrated gel reaching a predefined hydration level in the at least one hydration tank, to move the concentrated gel out of the at least one hydration tank and dilute the concentrated gel at the tee junction to form a fracturing carrier fluid and subsequently direct the fracturing carrier fluid to the header tank;

a mixer that blends the fracturing carrier fluid from the header tank with proppant supplied by a proppant supply tank to form a fracturing slurry; and a pump for pumping the fracturing slurry downhole at or less than a maximum slurry rate.

15. The system of claim 14, wherein the control system is further configured to control a concentration of the concentrated gel based on a predefined downhole concentration and the maximum slurry rate.

16. The system of claim 14, wherein the header tank has a first-in first-out flow configuration which adds additional residence time to the diluted gel.

17. The system of claim 14, wherein a residence time of the concentrated gel in the at least one hydration tank is dependent on the concentration of the concentrated gel and on a maximum concentrated gel rate.

18. The system of claim 17, wherein the residence time of the concentrated gel in the at least one hydration tank is sufficient to fully hydrate the concentrated gel.

19. The system of claim 17, wherein the residence time of the concentrated gel in the at least one hydration tank is sufficient to hydrate the gel at least 85%.

20. The system of claim 17, wherein the control system is further configured to control the maximum concentrated gel rate and a maximum dilution rate of the concentrated gel as it is diluted in the header tank.

21. The system of claim 20, wherein the control of the maximum concentrated gel rate and the maximum dilution rate of the concentrated gel is based on at least a performance curve generated by the control system.

22. The system of claim 17, wherein the maximum concentrated gel rate ranges from 0 bpm to 27 bpm.

23. The system of claim 14, wherein the control system is further configured to increase and decrease a rate of delivering the concentrated gel and a rate of diluting the concentrated gel with water to maintain a fluid level within the header tank.

* * * * *